(12) United States Patent
Song et al.

(10) Patent No.: US 7,476,462 B2
(45) Date of Patent: Jan. 13, 2009

(54) BATTERY PACK LOCKING DEVICE FOR PORTABLE WIRELESS TERMINAL

(75) Inventors: Hyon-Myong Song, Seoul (KR); Jae-Shik Kim, Seoul (KR); Jong-Cheon Wee, Yongin-shi (KR); Hwan-Seok Choi, Pyongtaek-shi (KR)

(73) Assignee: Samsung Electronics Co., Ltd (KR)

( * ) Notice: Subject to any disclaimer, the term of this patent is extended or adjusted under 35 U.S.C. 154(b) by 684 days.

(21) Appl. No.: 10/629,297

(22) Filed: Jul. 29, 2003

(65) Prior Publication Data
US 2004/0038121 A1 Feb. 26, 2004

(30) Foreign Application Priority Data
Aug. 24, 2002 (KR) ........... 10-2002-0050328
Sep. 16, 2002 (KR) ........... 10-2002-0056156

(51) Int. Cl.
*H01M 2/10* (2006.01)
(52) U.S. Cl. .................. 429/97; 429/96; 429/100; 429/123
(58) Field of Classification Search .......... 429/99; 292/DIG. 4, DIG. 37, DIG. 38, 19; 70/14, 70/58
See application file for complete search history.

(56) References Cited

U.S. PATENT DOCUMENTS

| 4,146,682 | A | * | 3/1979 | Nakao | 429/97 |
| 4,358,877 | A | * | 11/1982 | Burke | 24/641 |
| 5,621,618 | A | * | 4/1997 | Komiyama | 361/732 |
| 6,060,193 | A | * | 5/2000 | Remes et al. | 429/96 |
| 2004/0001997 | A1 | * | 1/2004 | Zatezalo et al. | 429/96 |

* cited by examiner

*Primary Examiner*—Jonathan Crepeau
*Assistant Examiner*—Tony Chuo
(74) *Attorney, Agent, or Firm*—The Farrell Law Firm, PC

(57) ABSTRACT

Disclosed is a battery pack locking device for a portable wireless terminal which is configured to utilize a locking method in which support protrusions formed at one end of a battery pack are engaged with support grooves formed at the terminal body of the portable wireless terminal, and the battery pack is then brought into close contact with the seat surface of the terminal body, while using a button member adapted to perform a depressing operation, thereby achieving an easy separation of the battery pack from the portable wireless terminal. In accordance with the configuration, it is possible to prevent the fingernail of the user from being damaged during the attachment or detachment procedure of the battery pack. In particular, it is unnecessary to provide an additional space for allowing a horizontal movement of the locking device. Accordingly, there is an increased flexibility in the design of the terminal appearance.

10 Claims, 18 Drawing Sheets

BATTERY PACK LOCKING DEVICE FOR PORTABLE WIRELESS TERMINAL

PRIORITY

This application claims priority to an application entitled "Battery Pack Locking Device For Portable Wireless Terminal" filed in the Korean Industrial Property Office on Aug. 24, 2002 and assigned Serial No. 2002-50328 and an application entitled "Battery Pack Locking Device For Portable Wireless Terminal", filed in the Korean Industrial Property Office on Sep. 16, 2002 and assigned Serial No. 2002-56156, the contents of which are hereby incorporated by reference.

BACKGROUND OF THE INVENTION

1. Field of the Invention

The present invention relates to a portable wireless terminal, and a battery pack locking device detachably mounted to the back surface of a terminal body in such a portable wireless terminal.

2. Description of the Related Art

Generally, a portable wireless terminal carries a battery pack mounted to the back surface of its terminal body as a power supply source. The battery pack is maintained in a locked state by a locking device provided at the terminal body.

The mounting of the battery pack is achieved using a method in which the battery pack is locked to the terminal body at one end thereof as it comes into close contact with a seat surface of the terminal body under the condition in which a support protrusion formed at the other end of the battery pack is engaged with a support groove formed at the terminal body, or a method in which the battery pack is locked to the terminal body as it slides along guide ribs formed at the back surface of the terminal body.

FIG. 1 is a perspective view illustrating a portable wireless terminal equipped with a conventional battery pack locking device denoted by the reference numeral 16 in FIG. 1. As shown in FIG. 1, the portable wireless terminal equipped with the conventional battery pack locking device 16 carries the battery pack 14 mounted to the back surface of a terminal body 10 consisting of lower and upper casing frames 11 and 12. That is, the battery pack 14 is mounted to the lower casing frame 11.

A seat surface 13 is formed at the back surface of the lower casing frame 11. Connecting terminals are protruded from the seat surface 13 at one end of the seat surface 13. The locking device 16 is installed at the lower casing frame 11 near the other end of the seat surface 13.

One or more support protrusions 15 are formed at one end of a surface of the battery pack contacting the seat surface 13 of the terminal body 10 so that they are engaged with one end of the terminal body 10. Although not shown, support grooves are formed at the back surface of the terminal body 10 so that they receive the support protrusions 15, respectively.

The procedure of mounting the battery pack 14 having the above described structure to the terminal body 10 is carried out as follows. That is, the support protrusions 15 of the battery pack 14 are first inserted into the support grooves formed at the back surface of the terminal body 10. Thereafter, the battery pack 14 is pivotally moved about the support protrusions 15 until it comes into close contact with the seat surface 13 of the terminal body 10. When the battery pack 14 comes into close contact with the seat surface 13, a hook 17 included in the locking device 16 is engaged with a groove (not shown) formed opposite to the support protrusions 15. Thus, the battery pack 14 is firmly locked to the terminal body 10 by the support protrusions 15 and hook 17.

On the other hand, when the battery pack 14 is to be separated from the terminal body 10, the locking device 16 is first moved in a longitudinal direction of the terminal body 10 until its hook 17 is separated from the associated groove of the battery pack 14, thereby causing the battery pack 14 to be separated from the locking device 16. When the support protrusions 15 are then separated from the terminal body 10, the battery pack 14 is separated from the terminal body 10.

However, the above mentioned battery pack locking device having a vertically detachable structure has a drawback in that when the user moves the locking device along a horizontal plane, using his fingertip, to release the locking device, the fingernail may be damaged. In severe cases, the user may be injured. Furthermore, there is a limitation in designing the appearance of the portable wireless terminal because the groove should be formed at the lower casing frame in order to provide a space for allowing the horizontal movement of the locking device.

FIG. 2 is a perspective view illustrating a portable wireless terminal equipped with another conventional battery pack locking device denoted by the reference numeral 27 in FIG. 2. As shown in FIG. 2, the portable wireless terminal equipped with the conventional battery pack locking device 27 carries a battery pack 24 mounted to a terminal body 20 consisting of lower and upper casing frames 21 and 22.

A seat, surface 23 is formed at the lower casing frame 21. The locking device 27 is installed at the lower casing frame 21 near one end of the seat surface 23. One or more guide ribs 26 are formed at each longitudinal edge of the seat surface 23 in order to guide the battery pack 24 to the locking device 27. Similarly, one or more engagement ribs 25 are formed at each longitudinal edge of the battery pack 24 so that they are engagable with the guide ribs 26.

The locking of the battery pack 24 to the portable wireless terminal having the above described structure is achieved by bringing the battery pack 24 into close contact with the seat surface 23, and then horizontally sliding the battery pack 24 toward the locking device 27 installed at one end of the seat surface 23, thereby bringing the battery pack 24 into close contact with the locking device 27. When the battery pack 24 comes into contact with the locking device 27, it causes the locking device 27 to move vertically. When the battery pack 24 comes into close contact with the locking device 27, a hook 28 included in the locking device 27 engages a groove (not shown) formed at the battery pack 24, thereby preventing a separation of the battery pack 24 from the portable wireless terminal. On the other hand, the separation of the battery pack 24 from the seat surface 23 is achieved by horizontally separating the battery pack 24 from the locking device 27 while depressing the locking device 27, and then lifting the battery pack 24.

However, the battery pack locking device having the above mentioned structure has a problem in that the guide ribs and engagement ribs respectively formed at the seat surface and battery pack are easily abraded, so that it is difficult to maintain the close contact state of the battery pack, thereby causing the power supply to the terminal to be unstable.

SUMMARY OF THE INVENTION

Therefore, an object of the invention is to provide a battery pack locking device capable of achieving easy separation of a battery pack from a portable wireless terminal.

Another object of the invention is to provide a battery pack locking device capable of achieving stable power supply to a portable wireless terminal.

In accordance with one aspect, the present invention provides a battery pack locking device for a portable wireless terminal comprising: a first locking section formed at a lower casing frame included in a body of the portable wireless terminal, and adapted to lock the battery pack to the lower casing frame and to release the lock of the battery pack; a button section formed to be integral with the first locking section, the button section being vertically movable; a second locking section interacting with the first locking section to vertically separate the battery pack from the lower casing frame; and a support section for supporting the battery pack to allow the battery pack to be vertically locked and lock-released.

In accordance with another aspect, the present invention provides a battery pack locking device for vertically locking a battery pack to a lower casing frame included in a portable wireless terminal, comprising: a button member mounted to the lower casing frame while being vertically movable, the button member having a first lock releasing section; a locking section protruded toward the battery pack from an end surface of the lower casing frame facing the button member; a second lock releasing section adapted to be subjected to a depression of the first lock releasing section when the button member moves vertically; a lock retaining section arranged adjacent to the second lock releasing section, and adapted to be engagable with the locking section to prevent the battery pack from being lock-released; and an elastic section installed at one end of the battery pack, the elastic section being elastically deformable in accordance with the depression of the first lock releasing section.

In accordance with another aspect, the present invention provides a battery pack locking device for vertically locking a battery pack to a lower casing frame included in a portable wireless terminal, comprising: a button member mounted to the lower casing frame while being vertically movable; a pair of spaced tension sections extending downwardly from the button while facing each other, the tension sections having an elasticity to be laterally movable; inner protrusions inwardly protruded from the tension sections while facing each other, respectively; and a locking section provided at one end of the battery pack to be engagable with the tension section, the locking section having, at opposite lateral surfaces thereof, outer protrusions adapted to come into slidable contact with the inner protrusions, respectively; whereby the battery pack is locked to the lower casing frame when the outer protrusions are positioned beneath the inner protrusions.

BRIEF DESCRIPTION OF THE DRAWINGS

The above objects and advantages of the present invention will become more apparent by describing in detail preferred embodiments thereof with reference to the attached drawings in which.

DETAILED DESCRIPTION OF THE PREFERRED EMBODIMENTS

Now, preferred embodiments of the present invention will be described in detail with reference to the annexed drawings. In the following description of the present invention, a detailed description of known functions and configurations is omitted to avoid making the subject matter of the present invention unclear.

Figure 1:
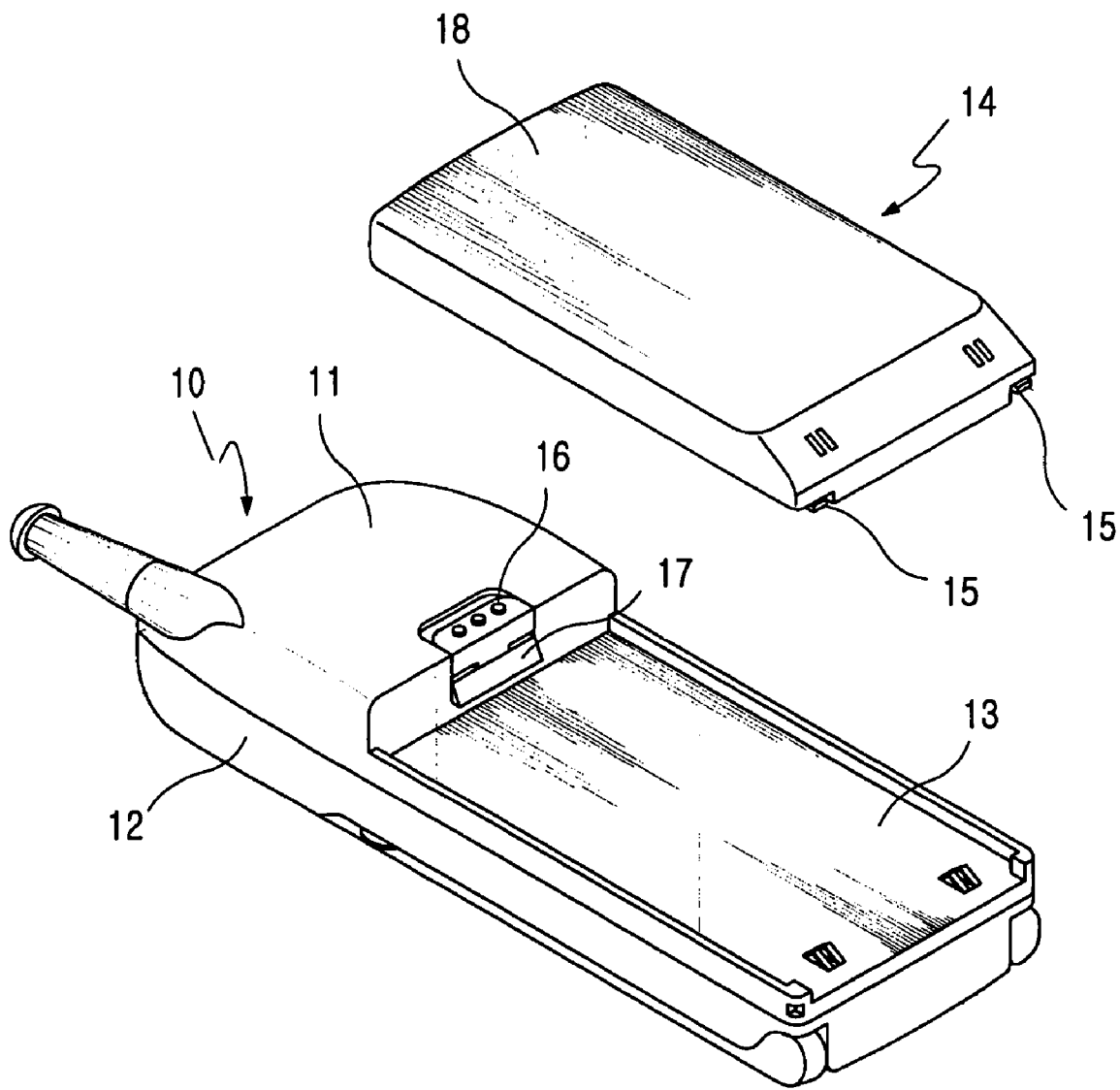
FIG. 1 is a perspective view illustrating a portable wireless terminal equipped with a conventional battery pack locking device.
Figure 2:
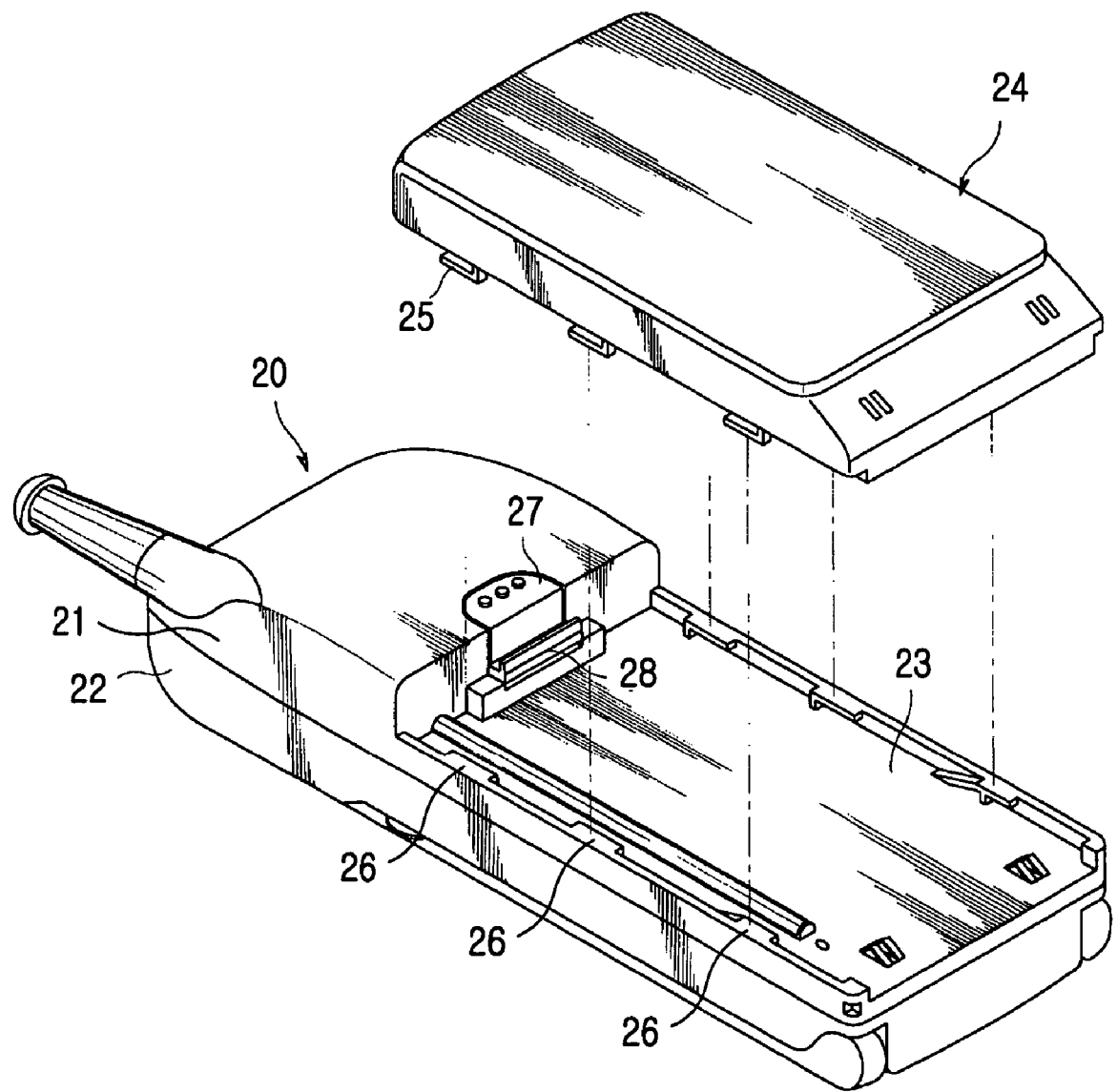
FIG. 2 is a perspective view illustrating a portable wireless terminal equipped with another conventional battery pack locking device.
Figure 3:
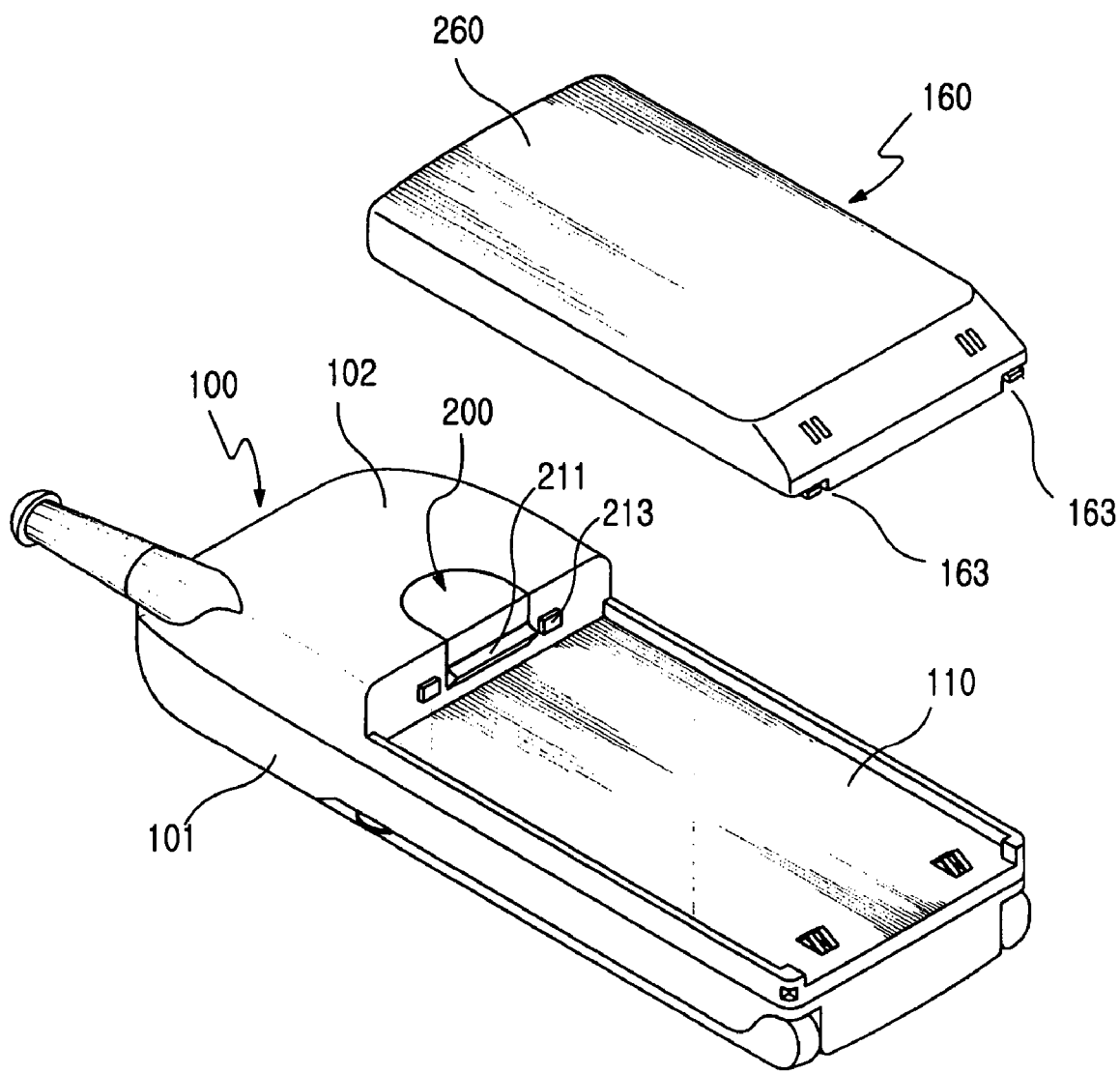
FIG. 3 is a perspective view illustrating a portable wireless terminal equipped with a battery pack locking device according to a first embodiment of the present invention.

FIG. 3 is a perspective view illustrating a portable wireless terminal 100 equipped with a battery pack locking device 200 according to a first embodiment of the present invention. As shown in FIG. 3, the portable wireless terminal 100, which includes the battery pack locking device 200 according to the first embodiment of the present invention, carries a battery pack 160 mounted to a seat surface 110 of a terminal body consisting of upper and lower casing frames 101, and 102.

The battery pack locking device 200 of the portable wireless terminal 100 shown in FIG. 3 uses a locking method in which support protrusions 163 formed at one end of the battery pack 160 are engaged with support grooves 111 (shown in FIG. 16) formed on the terminal 100, and the battery pack 160 is then locked to the terminal body at the other end thereof as it comes into close contact with the seat surface 110 of the terminal body.

Figure 16:
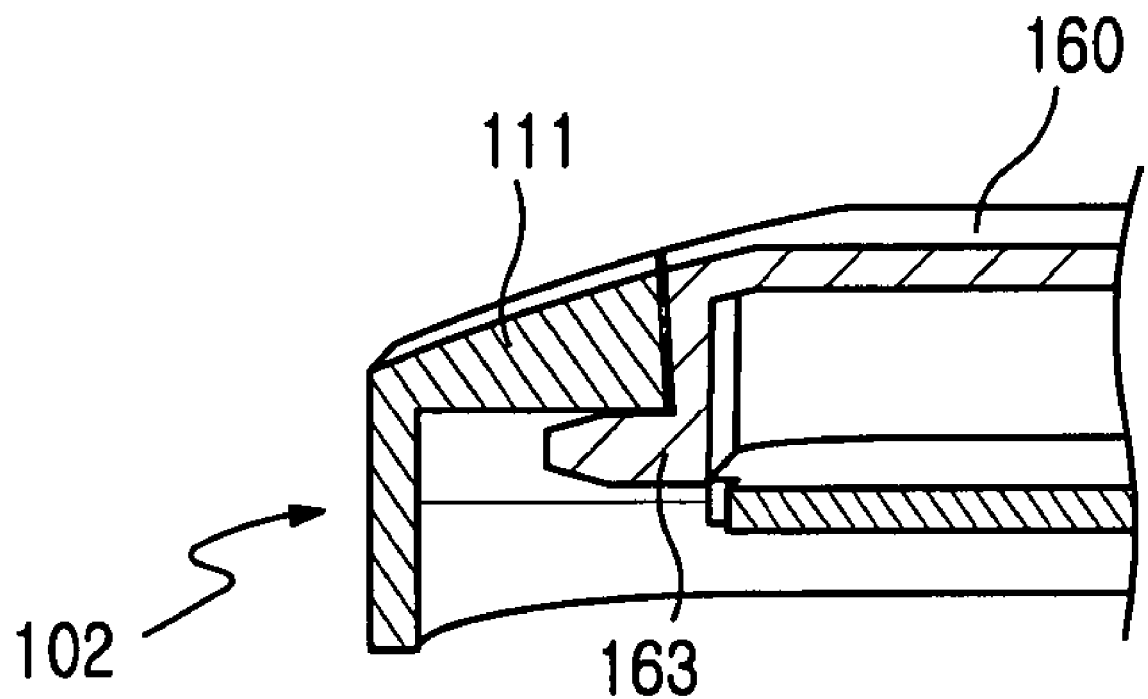
FIG. 16 is a cross-sectional view showing the battery pack support structure of the portable wireless terminal shown in FIG. 3.

In accordance with the above described locking method, the support protrusions 163 are provided at one end of the battery pack 160, and the support grooves (not shown) are formed on the seat surface 110 at positions corresponding to respective support protrusions 163. Referring to FIG. 16, each support protrusion 163 is engaged with the associated support groove 111 in a locked state when the terminal 100 is in close contact with the seat surface 110. When the locking device 200 of the battery pack 160 is released under the condition in which the battery pack 160 is in close contact with the seat surface 110, the battery pack 160 is elastically lifted by a certain vertical distance while being separated from the lower casing frame 102 because each support protrusion 163 is in a state of being pressed by the associated support groove 111.

Figure 4:
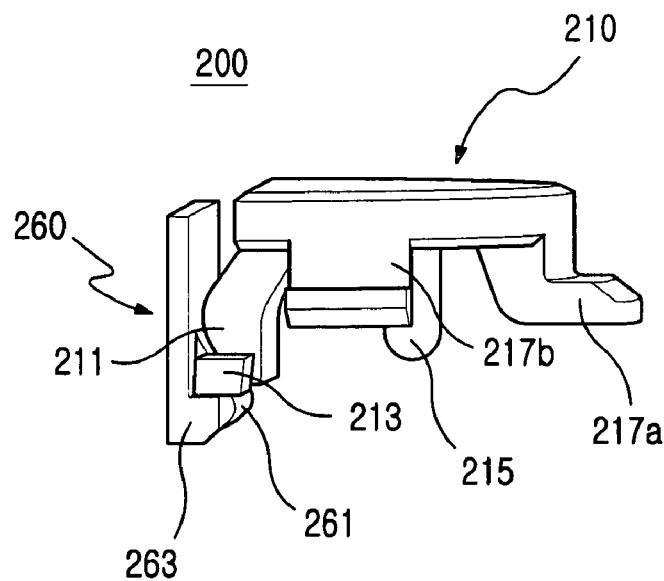
FIG. 4 is a perspective view illustrating the battery pack locking device of FIG. 3.
Figure 5:
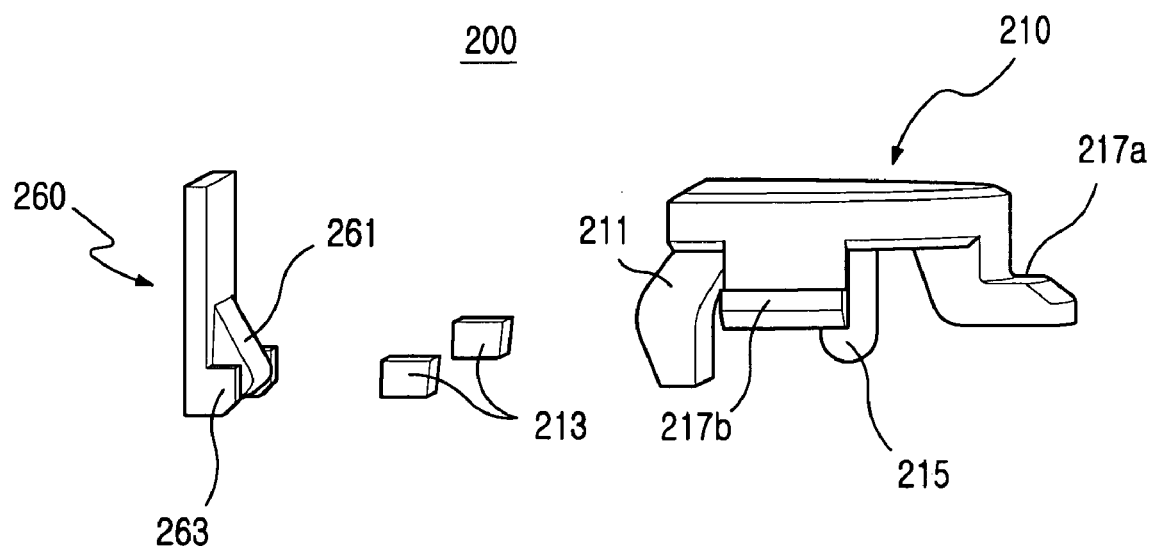
FIG. 5 is an exploded perspective view illustrating the configuration of the battery pack locking device shown in FIG. 3.

FIG. 4 is a perspective view illustrating the battery pack locking device 200 of FIG. 3. FIG. 4 shows the locked state of the battery pack 160 when it is in close contact with the seat surface 110 of the lower casing frame 102. FIG. 5 is an exploded perspective view illustrating the configuration of the battery pack locking device 200 shown in FIG. 3. As shown in FIGS. 4 and 5, the battery pack locking device 200 of the portable wireless terminal according to the first embodiment of the present invention includes a button member 210 mounted on the lower casing frame 102 of the terminal body such that it is vertically movable, i.e. moveable in a direction perpendicular to the seat surface 110 of the lower casing frame 102, at least one locking protrusion 213 protruded from the lower casing frame 102 such that it is positioned adjacent to the button member 210, and a locking rib 260 formed on the battery pack 160, and adapted to be engagable with the button member 210.

The button member 210 has a support portion 215 extending centrally from the inner surface of the button member 210 to support an elastic member (not shown), and at least two stoppers, that is, stoppers 217a and 217b in the illustrated case, having a shape extending downwardly from an outer peripheral surface of the button member 210, and then being outwardly bent to limit the vertical movement range of the button member 210, while guiding the vertical movement of the button member 210. The button member 210 also has a first lock releasing protrusion 211 extending vertically from one side portion of the outer peripheral surface of the button member 210, preferably, the outer peripheral surface portion of the button member 210 facing the seat surface 110 when the button member 210 is mounted to the lower casing frame 102. The first lock releasing protrusion 211 has a curved shape horizontally protruded toward the seat surface 110. The button member 210 having the above described structure is installed at the lower casing frame 102 of the terminal 100, and performs a function for releasing the locked state of the battery pack 160.

The locking protrusion 213 is protruded from the lower casing frame 102 toward the seat surface 110 such that it is positioned adjacent to the button member 210. One or more locking protrusions 213 may be provided. In the illustrated case, two locking protrusions 213 are formed at both side surfaces of the button member 210, respectively. Each locking protrusion 213 should have an angular structure such as a rectangular structure in order to provide a locking force when the battery pack 160 is locked.

The locking rib 260 is provided at the other end of the battery pack 160, and structured to be elastically deformed. The locking rib 260 has a second lock releasing protrusion 261 corresponding to the first lock releasing protrusion 211, and a locking hook 263 arranged adjacent to the second lock releasing protrusion 261 while corresponding to the locking protrusion 213. The second lock releasing protrusion 261 is pressed by the first lock releasing protrusion 211 when the button member 210 moves downwardly, thereby causing the locking rib 260 to be retracted. The locking hook 263 is engagable with the locking protrusion 213 to maintain the locked state of the battery pack 160. As the locking rib 260 is retracted in accordance with the depression operation of the button 210, the locking hook 263 is also retracted, thereby releasing its locked state to the locking protrusion 213.

Hereinafter, the operation of the locking device 200 will be described in more detail with reference to FIGS. 6 to 15.

Figure 6:
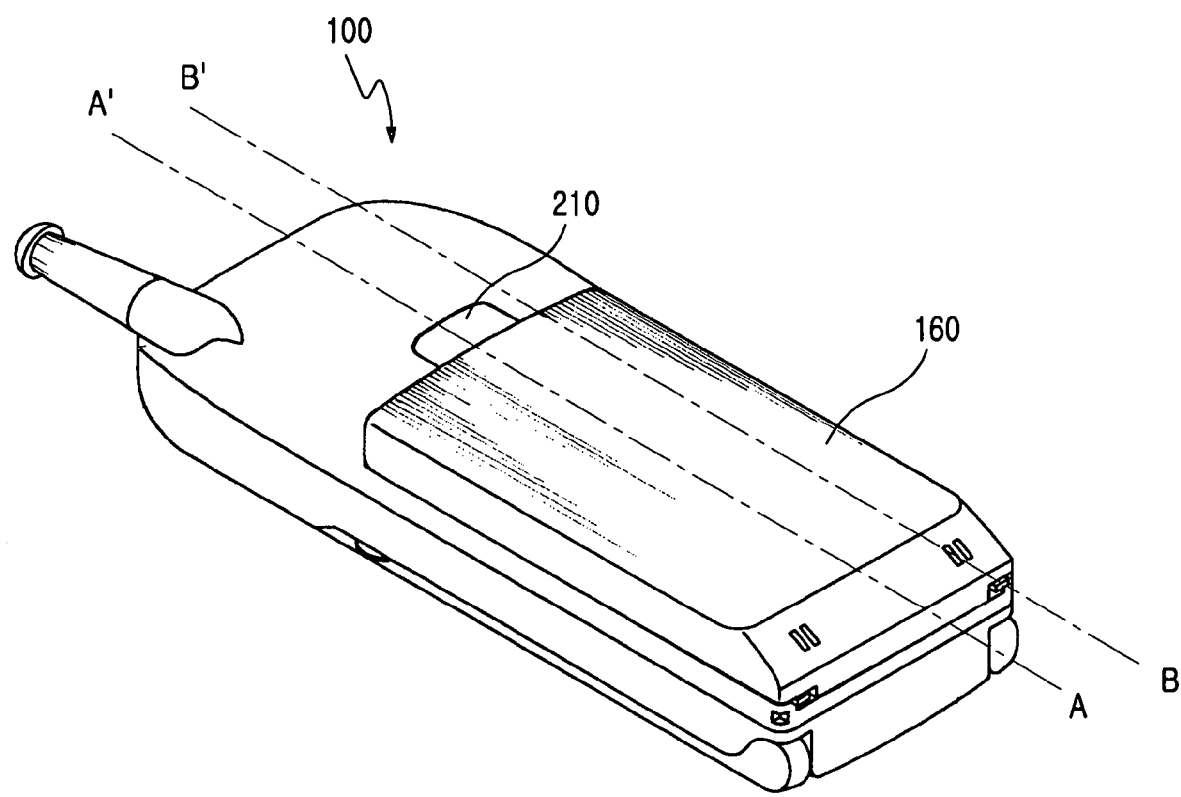
FIG. 6 is a perspective view showing the back surface of the portable wireless terminal shown in FIG. 3.

FIG. 6 is a perspective view showing the back surface of the portable wireless terminal 100 shown in FIG. 3. Referring to FIG. 6, the coupled or locked state of the battery pack 160 is shown.

Figure 7:
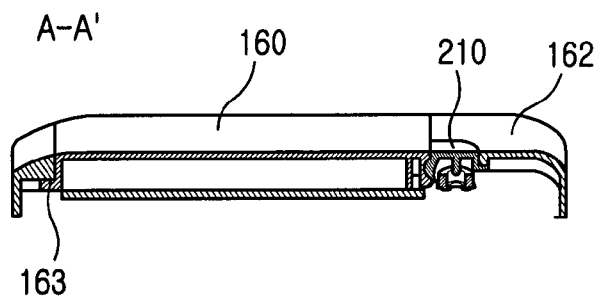
FIG. 7 is a cross-sectional view taken along the line A-A' of FIG. 6, illustrating the internal structure of the portable wireless terminal to which the battery pack is locked.
Figure 8:
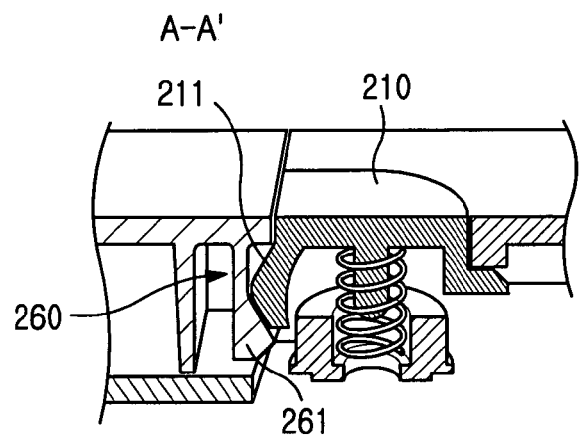
FIG. 8 is an enlarged cross-sectional view taken along the line A-A' of FIG. 6, illustrating the internal structure of the battery pack locking device.
Figure 9:
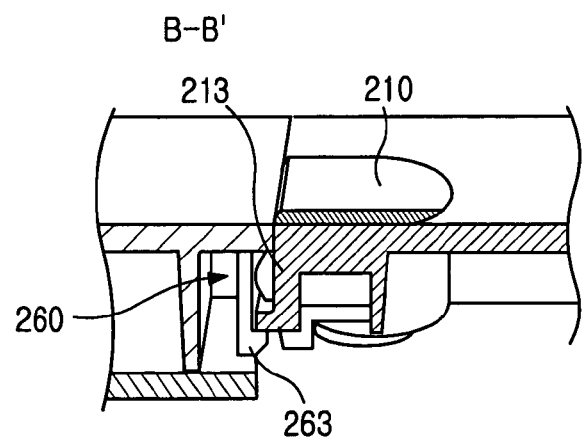
FIG. 9 is an enlarged cross-sectional view taken along the line B-B' of FIG. 6, illustrating the internal structure of the battery pack locking device.

FIGS. 7 to 9 are views illustrating the locked state of the battery pack 160 to the back surface of the portable wireless terminal shown in FIG. 6, respectively.

FIG. 7 is a cross-sectional view taken along the line A-A' of FIG. 6, illustrating the internal structure of the portable wireless terminal to which the battery pack 160 is locked. FIG. 8 is an enlarged cross-sectional view taken along the line A-A' of FIG. 6, illustrating the internal structure of the battery pack locking device 200. FIG. 9 is an enlarged cross-sectional view taken along the line B-B' of FIG. 6, illustrating the internal structure of the battery pack locking device 200.

As shown in FIGS. 7 to 9, in a state in which the battery pack 160 is locked to the back surface of the portable wireless terminal, the second lock releasing protrusion 261 is positioned just beneath the first lock releasing protrusion 211, whereas the locking protrusion 213 and locking hook 263 are engaged with each other to provide a desired locking effect. At this time, the locking rib 260 is in a state of being subjected to no elastic deformation because no external force is applied thereto in the horizontal direction.

Figure 10:
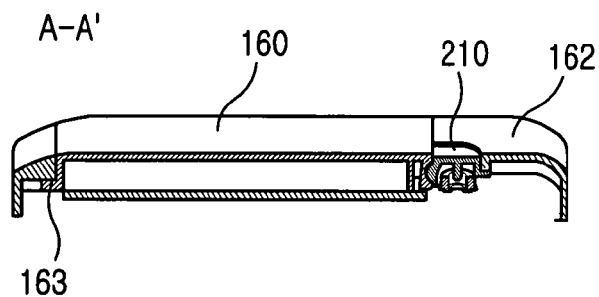
FIG. 10 is a cross-sectional view taken along the line A-A' of FIG. 6, illustrating the internal structure of the portable wireless terminal in a state in which the locked state of the battery pack is released.
Figure 11:
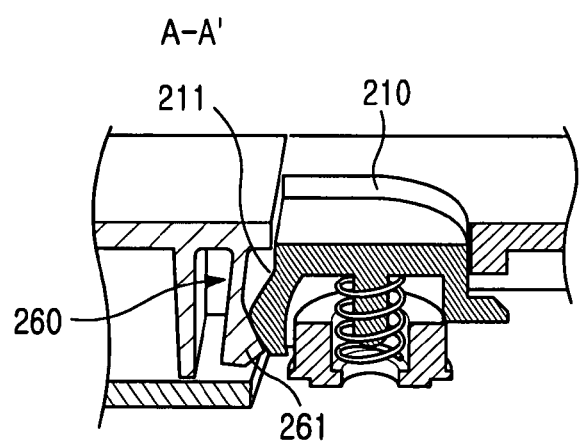
FIG. 11 is an enlarged cross-sectional view taken along the line A-A' of FIG. 6, illustrating the internal structure of the battery pack locking device shown in FIG. 6 in order to explain the lock releasing operation of the battery pack locking device.
Figure 12:
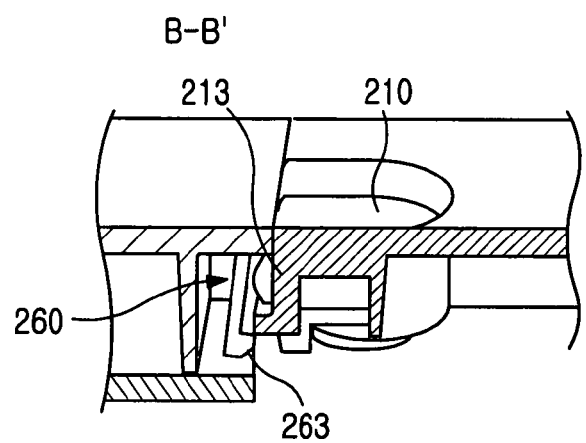
FIG. 12 is an enlarged cross-sectional view taken along the line B-B' of FIG. 6, illustrating the internal structure of the battery pack locking device shown in FIG. 6, in order to explain the lock releasing operation of the battery pack locking device.

FIGS. 10 to 12 are views illustrating the lock releasing operation of the battery pack locking device 200 in the portable wireless terminal shown in FIG. 6.

FIG. 10 is a cross-sectional view taken along the line A-A' of FIG. 6, illustrating the internal structure of the portable wireless terminal in a state in which the locked state of the battery pack 160 is released. FIG. 11 is an enlarged cross-sectional view taken along the line A-A' of FIG. 6, illustrating the internal structure of the battery pack locking device 200 shown in FIG. 6 in order to explain the lock releasing operation of the battery pack locking device 200. FIG. 12 is an enlarged cross-sectional view taken along the line B-B' of FIG. 6, illustrating the internal structure of the battery pack locking device 200 shown in FIG. 6, in order to explain the lock releasing operation of the battery pack locking device 200.

As shown in FIGS. 10 to 12, when the button member 210 is depressed to release the locked state of the battery pack 160, the first lock releasing protrusion 211 pushes the second lock releasing protrusion 261 while being downwardly moved, thereby causing the locking rib 260 to be retracted. As a result, the locking hook 263 of the locking rib 260 is retracted, so that the locking state of the locking protrusion 213 and locking hook 263 is released.

Figure 13:
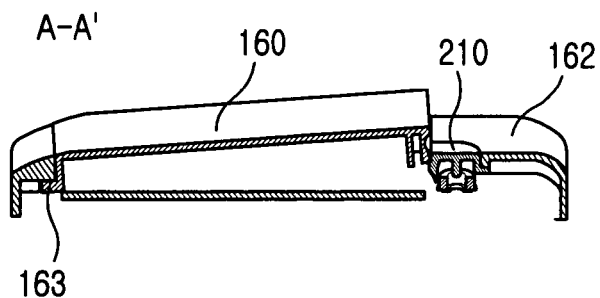
FIG. 13 is a cross-sectional view illustrating the procedure in which the battery pack is separated from the portable wireless terminal shown in FIG. 6.
Figure 14:
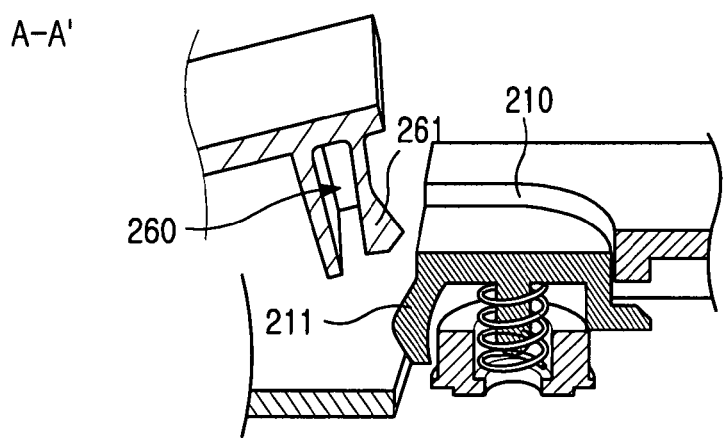
FIG. 14 is an enlarged cross-sectional view taken along the line A-A' of FIG. 6, illustrating the procedure in which the battery pack is separated from the portable wireless terminal shown in FIG. 6.
Figure 15:
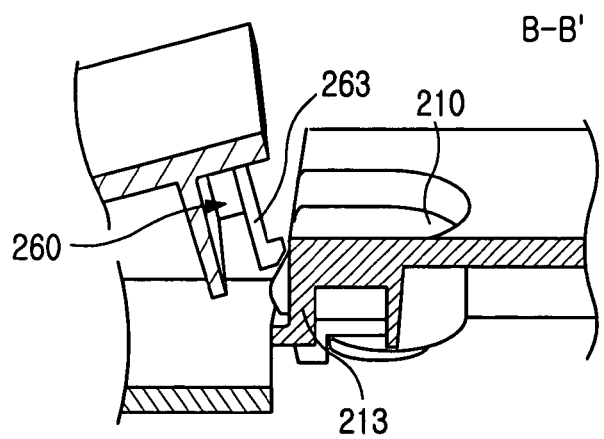
FIG. 15 is an enlarged cross-sectional view taken along the line B-B' of FIG. 6, illustrating the procedure in which the battery pack 160 is separated from the portable wireless terminal shown in FIG. 6.

FIGS. 13 to 15 are views illustrating the separated state of the battery pack 160 from the portable wireless terminal shown in FIG. 6.

FIG. 13 is a cross-sectional view illustrating the procedure in which the battery pack 160 is separated from the portable wireless terminal shown in FIG. 6. FIG. 14 is an enlarged cross-sectional view taken along the line A-A' of FIG. 6, illustrating the procedure in which the battery pack 160 is separated from the portable wireless terminal shown in FIG. 6. FIG. 15 is an enlarged cross-sectional view taken along the line B-B' of FIG. 6, illustrating the procedure in which the battery pack 160 is separated from the portable wireless terminal shown in FIG. 6.

As shown in FIGS. 13 to 15, the lock-released battery pack 160 is separated from the portable wireless terminal as its end positioned at the locking device is upwardly lifted in the perpendicular direction from the seat surface 110 of the lower casing frame 102 by a desired vertical distance. This operation is achieved because the support protrusions 163 provided at one end of the battery pack 160 are in a state of being pressed by the associated support grooves 111 of the lower casing frame 102.

As apparent from the above description, the battery pack locking device according to the embodiment of the present invention uses the button member adapted to perform a depressing operation while applying, thereto, the locking method in which the support protrusions formed at one end of the battery pack 160 are engaged with the support grooves formed at the terminal body, and the battery pack is then brought into close contact with the seat surface of the terminal body.

Figure 17:
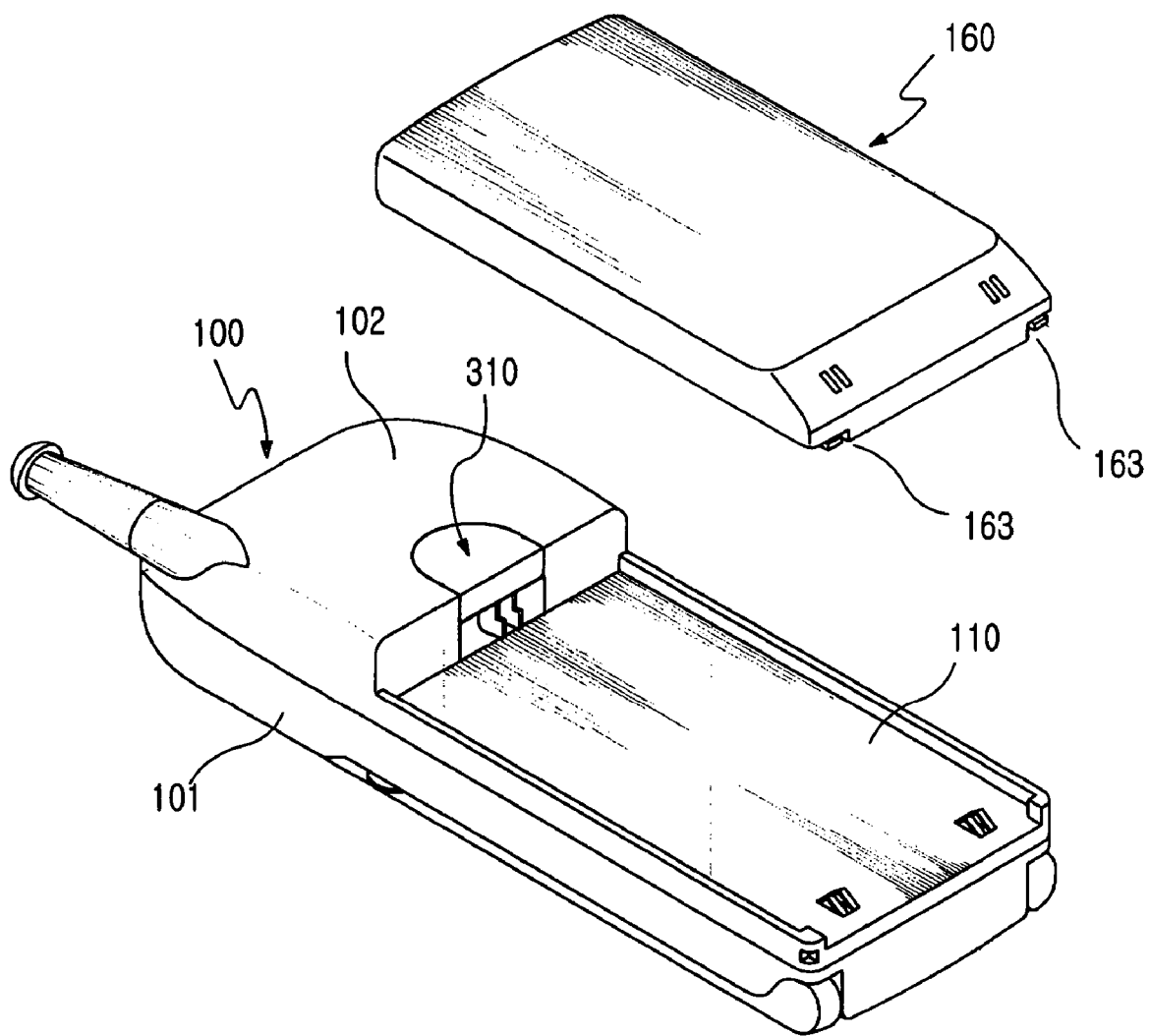
FIG. 17 is a perspective view illustrating a portable wireless terminal equipped with a battery pack locking device according to a second embodiment of the present invention.

FIG. 17 is a perspective view illustrating a portable wireless terminal equipped with a battery pack locking device according to a second embodiment of the present invention. In FIG. 17, elements respectively corresponding to those in FIG. 3 are denoted by the same reference numerals. The portable wireless terminal 100 shown in FIG. 17 has the same configuration as that of the previously described embodiment, except for its locking device including a locking rib 365 (not shown in FIG. 17) formed at the battery pack 160, and a button member 310 provided at the lower casing frame 102 of the terminal 100. Accordingly, only the battery pack locking device according to the second embodiment of the present invention will be described with reference to FIGS. 18 to 21.

Figure 18:
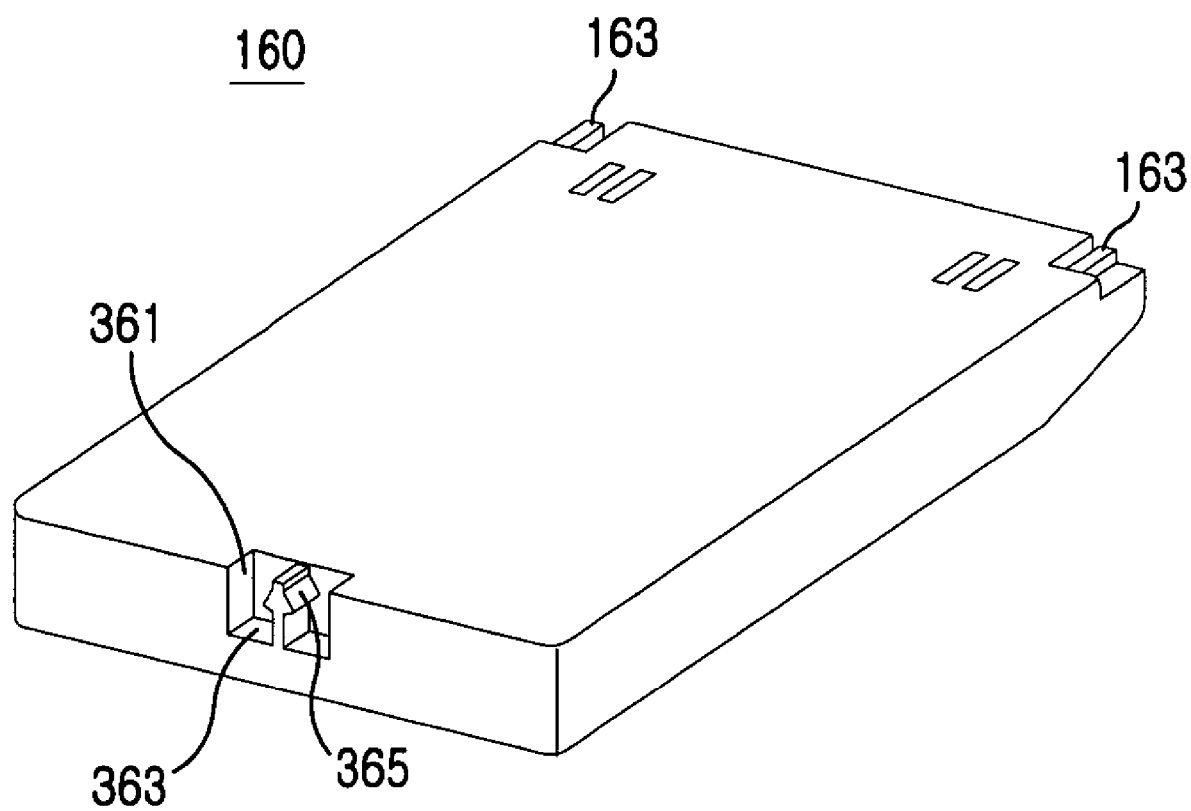
FIG. 18 is a perspective view showing the lower surface of the battery pack shown in FIG. 17.

FIG. 18 is a perspective view showing the lower surface of the battery pack 160 shown in FIG. 17. As shown in FIG. 18, the battery pack locking device, which is denoted by the reference numeral 300, includes a locking rib 365 formed at the lower surface of the battery pack 160 at one end of the battery pack 160.

Figure 19:
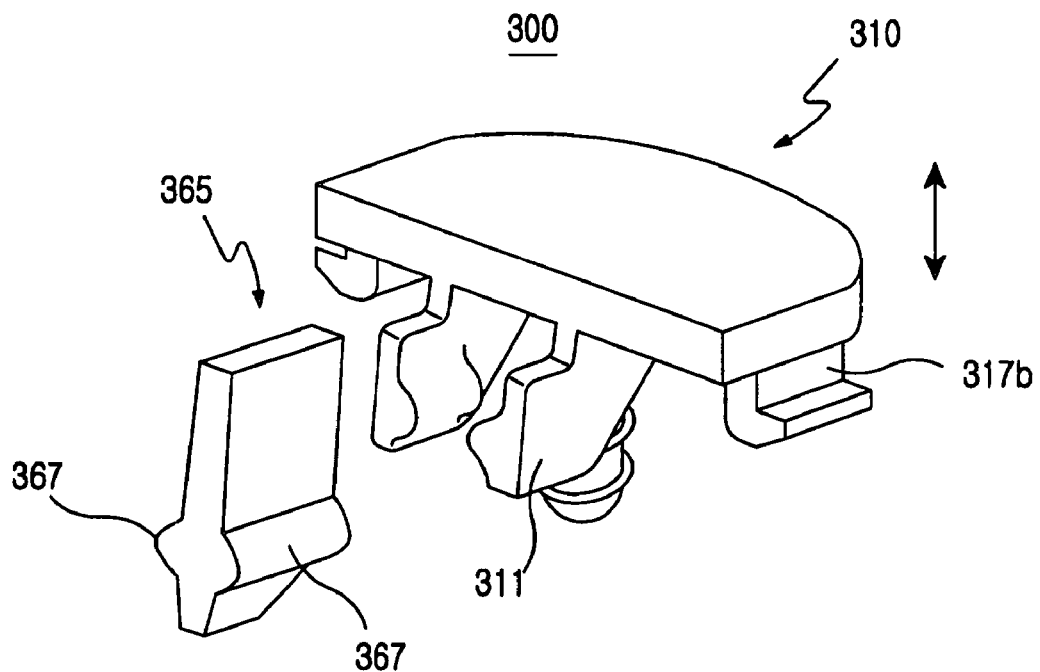
FIG. 19 is an exploded perspective view illustrating the configuration of the battery pack locking device shown in FIG. 17.

The locking rib 365 extends downwardly from a top surface 363 of a rib groove 361 formed at one end of the battery pack 160. Referring to FIG. 19, the locking rib 365 is provided at opposite side surfaces thereof with round outer protrusions 367 extending outwardly.

Figure 20:
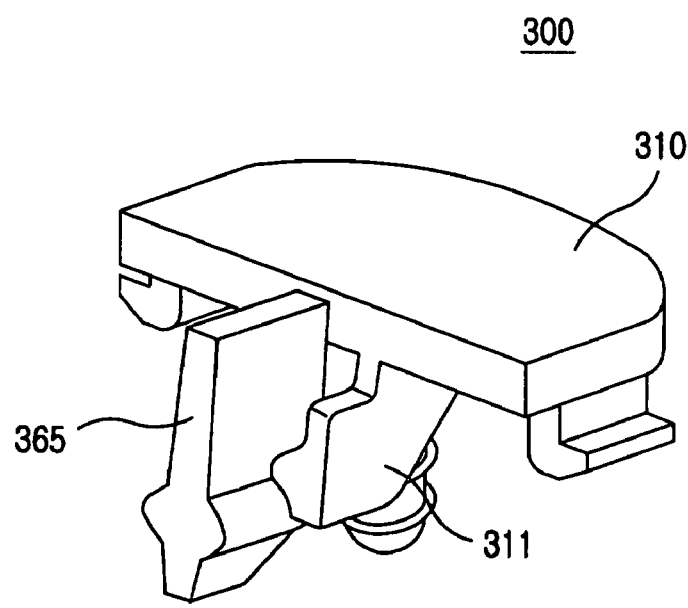
FIG. 20 is another exploded perspective view illustrating the configuration of the battery pack locking deice shown in FIG. 17.
Figure 21:
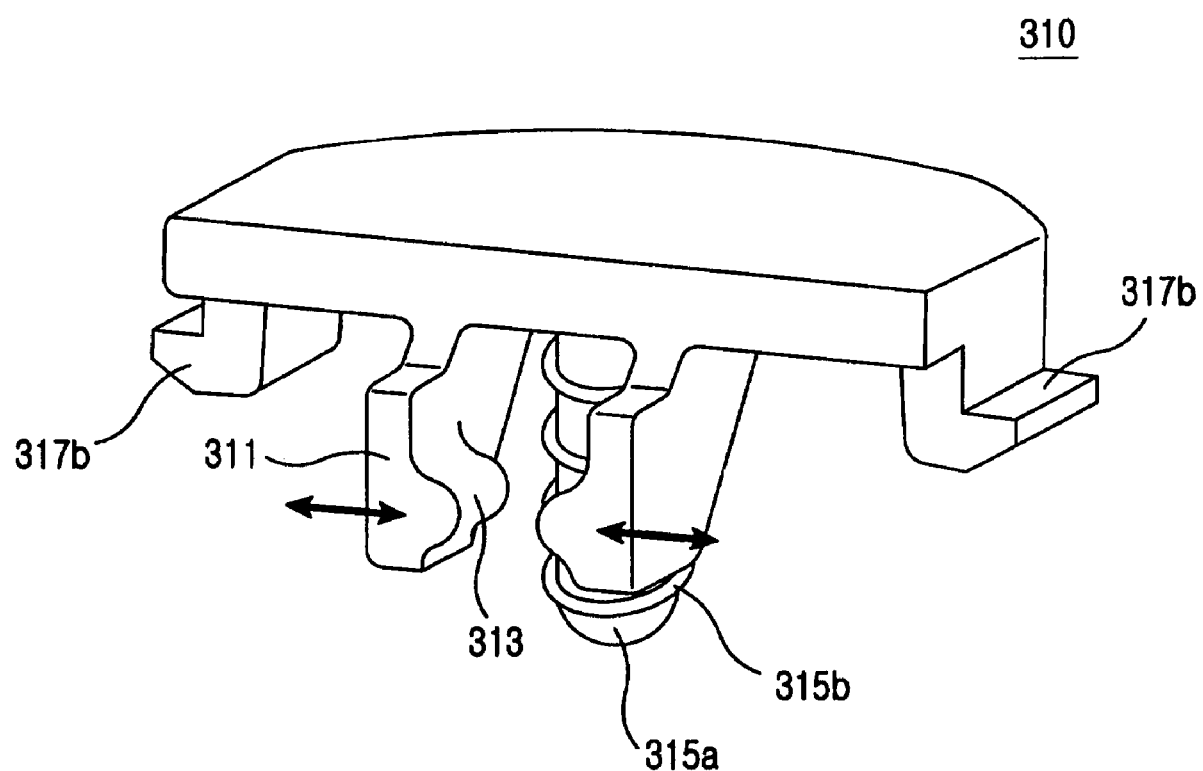
FIG. 21 is an enlarged perspective view illustrating a button member included in the battery pack locking device shown in FIG. 19.

FIG. 19 is an exploded perspective view illustrating the configuration of the battery pack locking device 300 shown in FIG. 17. FIG. 20 is another perspective view illustrating the configuration of the battery pack locking deice 300 shown in FIG. 17. FIG. 21 is an enlarged perspective view illustrating the button member 310 included in the battery pack locking device 300 shown in FIG. 19.

As shown in FIGS. 19 to 21, the battery pack locking device 300 of the portable wireless terminal according to the second embodiment of the present invention includes the button member 310 mounted to the lower casing frame 102 of the terminal body such that it is vertically movable, and the locking rib 365 formed on the battery pack 160.

The button member 310 has a support portion 315*a* extending centrally from the inner surface of the button member 310 to support an elastic member 315*b*, and at least two stoppers 317*b* having a shape extending downwardly from an outer peripheral surface of the button member 310, and then being outwardly bent to limit the vertical movement range of the button member 310, while guiding the vertical movement of the button member 310.

The button member 310 is maintained to be flush, at its upper surface, with the outer surface of the lower casing frame 102 by the elastic force of the elastic member 315*b*. When the button member 310 receives an external force, it is vertically moved against the elastic force of the elastic member 316*b*.

Two tension ribs 311 extend vertically, i.e. in the perpendicular direction, from the lower surface of the button member 310 while being protruded beyond the end of the button member 310 toward the battery pack 160. The tension ribs 311 are spaced apart from each other to face each other so that the locking rib 365 is interposed between the tension ribs 311 when the battery pack 160 is mounted. The tension ribs 311 have round inner protrusions 313 inwardly protruded to face each other, respectively. When the battery pack 160 is in its mounted state, the protrusions 313 are in contact with the outer surfaces of the locking ribs 365, respectively.

In the attachment or detachment procedure of the battery pack 160, the inner protrusions 313 come into slidable contact with the outer protrusions 367 of the locking rib 365, respectively. That is, when the locking rib 365 moves vertically with respect to the tension ribs 311, each inner protrusion 313 slides along the round surface of the associated outer protrusion 367, thereby causing the associated tension rib 311 to move outwardly while being elastically deformed.

When the outer protrusions 367 are positioned beneath the inner protrusions 313, the battery pack 160 is locked to the lower casing frame 102.

Similarly to the above described first embodiment, a configuration may be implemented in this second embodiment, in which each support protrusion 163 is engaged in the associated support groove in a pressed state when the battery pack 160 is in close contact with the seat surface 110, as shown in FIG. 16. In accordance with this configuration, the battery pack 160 is elastically lifted from the seat surface 110 by the certain vertical distance when it is separated from the lower casing frame 102.

The operation of the battery pack locking device 300 will now be described with reference to FIGS. 22 to 30.

Figure 22:
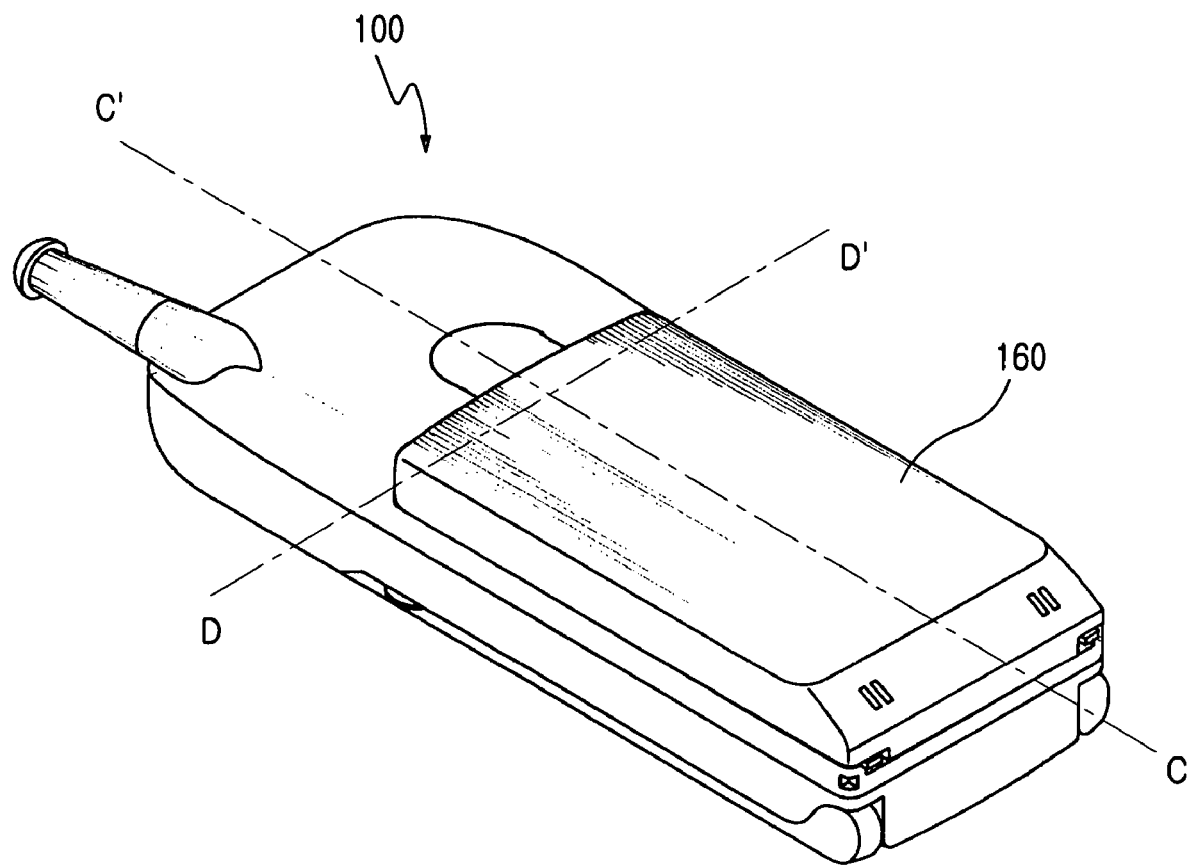
FIG. 22 is a perspective view illustrating the locked state of the battery pack to the lower casing frame of the portable wireless terminal shown in FIG. 17.
Figure 23:
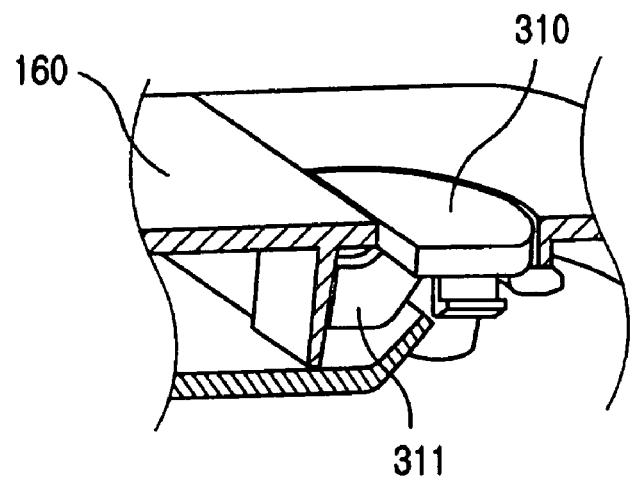
FIG. 23 is an enlarged cross-sectional view taken along the line C-C' of FIG. 22, illustrating the internal structure of the portable wireless terminal to which the battery pack is locked.
Figure 24:
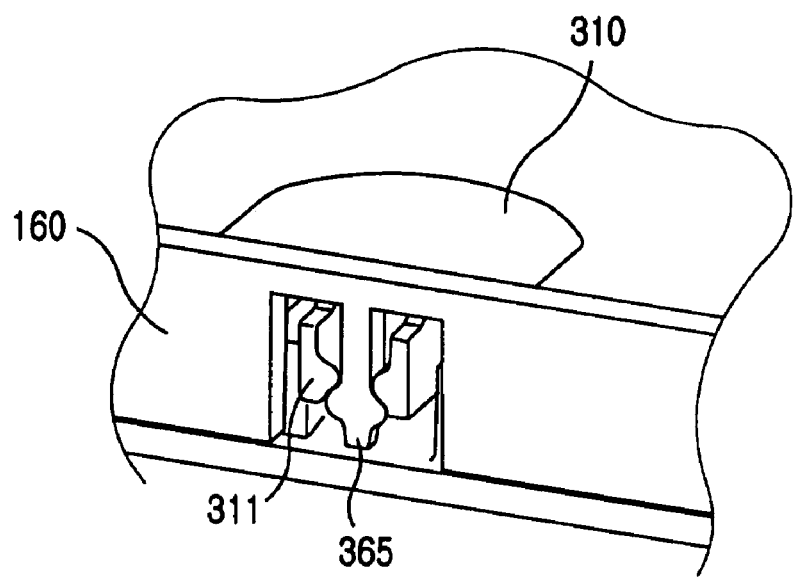
FIG. 24 is an enlarged cross-sectional view taken along the line D-D' of FIG. 22, illustrating a lock releasing operation of the battery pack locking device shown in FIG. 22.

FIG. 22 is a perspective view illustrating the locked state of the battery pack 160 to the lower casing frame 102 of the portable wireless terminal shown in FIG. 17. FIG. 23 is an enlarged cross-sectional view taken along the line C-C' of FIG. 22, illustrating the internal structure of the portable wireless terminal 100 to which the battery pack 160 is locked. FIG. 24 is an enlarged cross-sectional view taken along the line D-D' of FIG. 22, illustrating the internal structure of the portable wireless terminal 100.

As shown in FIGS. 23 and 24, the outer surfaces of the lower casing frame 102, battery pack 160, and button member 310 are flush with one another when the battery pack 160 is in a coupled state. In this state, the locking rib 365 is positioned between the tension ribs 311 of the button member 310. When the battery pack 160 is completely coupled to the lower casing frame 102, the outer protrusions 367 are positioned beneath the inner protrusions 313, so that they are locked by the inner protrusions 313. Thus, the battery pack 160 is locked.

FIGS. 25 to 30 are cross-sectional views each taken along the line C-C' or D-D' of FIG. 22, illustrating the internal structure of the portable wireless terminal 100. These drawings show sequential steps of the procedure for releasing the locking state of the locking device 300, respectively.

Figure 25:
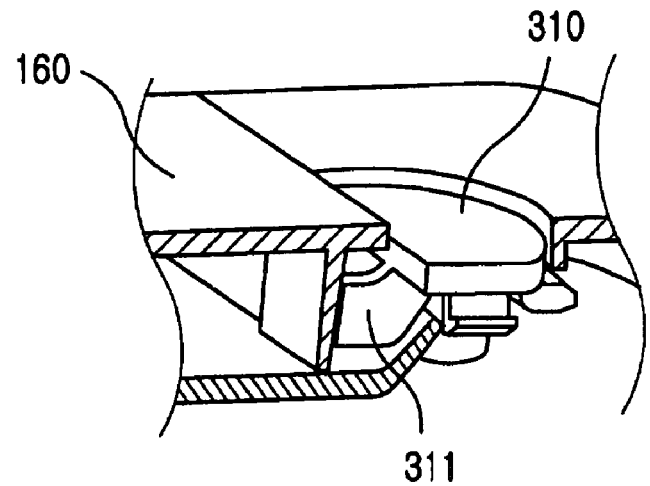
FIG. 25 is an enlarged cross-sectional view taken along the line C-C' of FIG. 22, illustrating the lock releasing operation of the battery pack locking device shown in FIG. 22.
Figure 26:
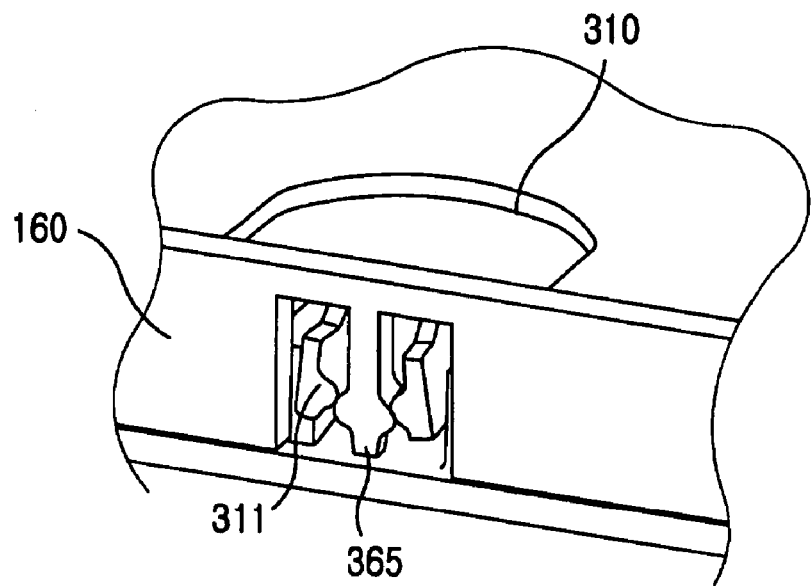
FIG. 26 is an enlarged cross-sectional view taken along the line D-D' of FIG. 22, illustrating the lock releasing operation of the battery pack locking device shown in FIG. 22.

FIGS. 25 and 26 show the initial state of the button member 310 in the locking device 300 when the button member 310 is depressed. When the button member 310 is depressed in the locked state of the battery pack 160, the inner protrusions 313 are spaced away from each other while being downwardly moved along the round surface of the outer protrusions 367, respectively. As a result, the tension ribs 311 are spaced away from each other while being elastically deformed. At this time, elastic force acting in a direction urging the inner and outer protrusions 313 and 367 toward each other is stored in the tension ribs 311.

Figure 27:
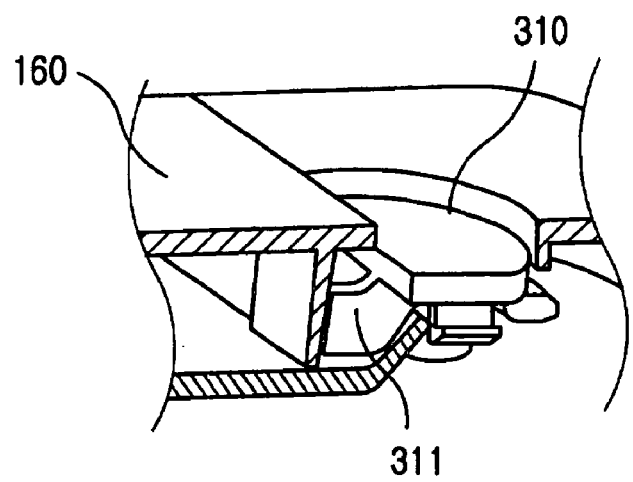
FIG. 27 is an enlarged cross-sectional view taken along the line C-C' of FIG. 22, illustrating the lock releasing operation of the battery pack locking device shown in FIG. 22.
Figure 28:
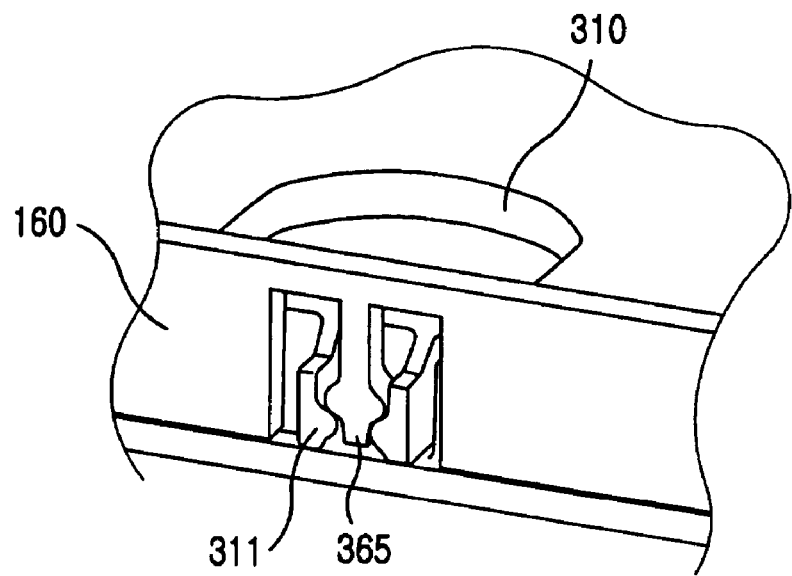
FIG. 28 is an enlarged cross-sectional view taken along the line D-D' of FIG. 22, illustrating the lock releasing operation of the battery pack locking device shown in FIG. 22.

FIGS. 27 and 28 show the state in which the inner and outer protrusions 313 and 367 pass a point of intersection where their apexes intersect with each other, as the button member 310 is further depressed. When the inner and outer protrusions 313 and 367 pass the intersection point, the inner protrusions 313 urge the locking rib 365 to move upwardly while pressing the outer protrusions 367. Such an effect is achieved in that the inner and outer protrusions 313 and 367 have round surfaces, respectively. As a result, the locking state of the locking device 300 is released, so that the battery pack 160 is separated from the lower casing frame 102.

The elastic member 315b may be arranged beneath the button member 310, as in the first embodiment. In this case, when the external depression force applied to the button member 310 is released, the button member 310 is elastically moved in an upward direction by the elastic force of the elastic member 315b. In accordance with the elastic upward movement of the button member 310, the inner protrusions 313 raise the outer protrusions 367. Also, where each support protrusion 163 formed at the other end of the battery pack 160 is configured to be pressed by the associated support groove (denoted by the reference numeral 111 in FIG. 16), the separation of the battery pack 160 can be more easily achieved.

Figure 29:
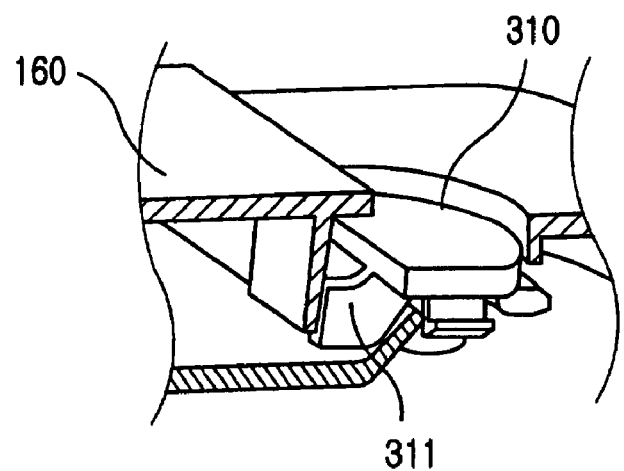
FIG. 29 is an enlarged cross-sectional view taken along the line C-C' of FIG. 22, illustrating the lock releasing operation of the battery pack locking device shown in FIG. 22.
Figure 30:
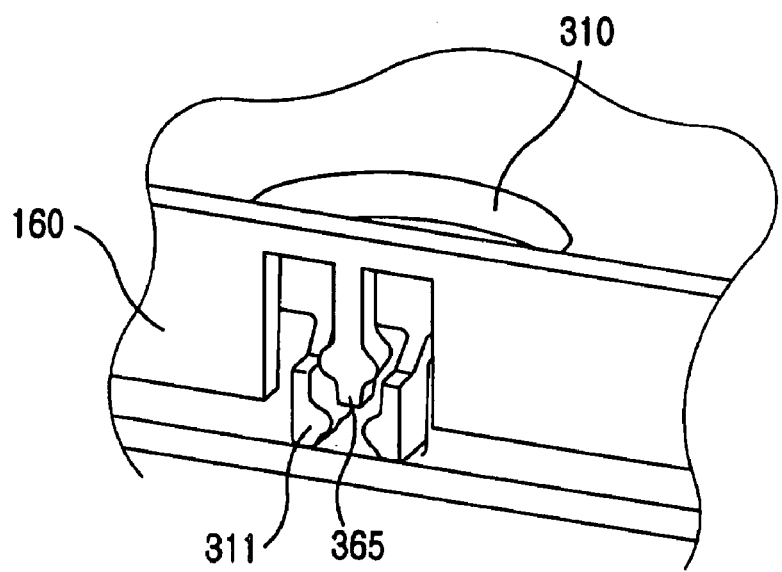
FIG. 30 is an enlarged cross-sectional view taken along the line D-D' of FIG. 22, illustrating the lock releasing operation of the battery pack locking device shown in FIG. 22.

FIGS. 29 and 30 illustrate the completely separated state of the battery pack 160. When the battery pack 160 is completely separated, the tension ribs 311 are recovered to their initial states, that is, their non-deformed states. Although the button member 310 is shown in FIGS. 29 and 30 as being in a depressed state, it is upwardly moved to a position flush with the outer surface of the lower casing frame 102 by the elastic member 315b when the depression force is released from the button member 310.

The coupling of the battery pack 160 is completed only by bringing the battery pack 160 into contact with the seat surface 110 under the condition in which the support protrusions 163 of the battery pack 160 are engaged with the support grooves 111 of the lower casing frame 102. During this procedure, there is no movement of the button member 310. In this procedure, only the elastic deformation of the tension ribs 311 occurs as the outer protrusions 367 of the locking rib 365 are downwardly moved to a position beneath the inner protrusions 313 of the tension ribs 311.

As apparent from the above description, the battery pack locking device according to the present invention is configured to utilize a locking method in which support protrusions formed at one end of a battery pack are engaged with support grooves formed at the terminal body of a portable wireless terminal, and the battery pack is then brought into close contact with the seat surface of the terminal body, while using a button member adapted to perform a depressing operation, thereby achieving an easy separation of the battery pack from the portable wireless terminal. In accordance with such a configuration, it is possible to prevent the fingernail of the user from being damaged during the attachment or detachment procedure of the battery pack. In particular, it is unnecessary to provide an additional space for allowing a horizontal movement of the locking device. Accordingly, there is an increased flexibility in the design of the terminal appearance.

While this invention has been described in connection with what is presently considered to be the most practical and preferred embodiment, it is to be understood that the invention is not limited to the disclosed embodiment, but, on the contrary, it is intended to cover various modifications within the spirit and scope of the appended

What is claimed is:

1. A battery pack locking device for a portable wireless terminal, comprising:
   a first locking section formed on a lower casing frame included in a body of the portable wireless terminal, and adapted to lock a battery pack to the lower casing frame and to release the lock of the battery pack;
   a button section integrally formed with the first locking section;
   a second locking section interacting with the first locking section to separate the battery pack from the lower casing frame; and
   a support section for supporting the battery pack to allow the battery pack to be locked and lock-released,
   wherein when the button section is pushed, the button section and the first locking section move downward toward the lower casing frame in a first direction perpendicular to the lower casing frame so that the battery pack is lock-released and elastically lifted away from the lower casing frame in the first direction.

2. A battery pack locking device for locking a battery pack to a lower casing frame included in a portable wireless terminal, comprising:
   a button member mounted on the lower casing frame while being movable in a first direction perpendicular to the lower casing frame, the button member having a first lock releasing section,
   wherein when the button section is pushed toward the lower casing frame in the first direction, the battery pack is lock-released and elastically lifted away from the lower casing frame in the first direction;
   a locking section protrusion protruded toward the battery pack from an end surface of the lower casing frame adjacent to the button member; and
   an elastic section installed at one end of the battery pack, the elastic section being elastically deformable in accordance with the depression of the first lock releasing section,
   wherein the elastic section comprises:
      a second lock releasing section adapted to be subjected to a depression of the first lock releasing section when the button member moves in the first direction, and
      a lock retaining section arranged adjacent to the second lock releasing section, and adapted to be engagable with the locking section to prevent the battery pack from being lock-released.

3. The battery pack locking device according to claim 2, wherein each of the first and second lock releasing sections has a round surface, and the first lock releasing section presses the second lock releasing section when the button member is depressed, so that the elastic section is elastically deformed, thereby releasing a lock retained between the locking section and the lock retaining section.

4. The battery pack locking device according to claim 2, wherein the lock retaining section has a round lower surface which the locking section presses when the battery pack is to be locked, thereby causing the elastic section to be elastically deformed.

5. The battery pack locking device according to claim 2, wherein the lock retaining section has an inclined lower surface which the locking section presses when the battery pack is to be locked, thereby causing the elastic section to be elastically deformed.

6. The battery pack locking device according to claim 2, further comprising:
   support sections protruded from the other end of the battery pack; and
   support grooves engagable with the support sections, respectively, each of the support grooves pressing an associated one of the support sections engaged therewith.

7. A battery pack locking device for locking a battery pack to a lower casing frame included in a portable wireless terminal, comprising:
   a button member mounted to the lower casing frame while being movable in a first direction perpendicular to the lower casing frame, wherein when the button section is pushed toward the lower casing frame in the first direction, the battery pack is lock-released and elastically lifted away from the lower casing frame in the first direction;
   a pair of spaced tension sections extending downwardly from the button while facing each other, the tension sections having an elasticity to be movable in the first direction;
   a plurality of inner protrusions inwardly protruded from the tension sections while facing each other, respectively; and
   a locking section provided at one end of the battery pack to be engagable with the tension sections, the locking section having, at opposite lateral surfaces thereof, outer protrusions adapted to come into slidable contact with the inner protrusions, respectively, whereby the battery pack is locked to the lower casing frame when the outer protrusions are positioned beneath the inner protrusions.

8. The battery pack locking device according to claim 7, wherein:
   the locking section extends downwardly from a top surface of a rib groove formed at the one end of the battery pack; and
   the tension sections extend beyond an end of the button member toward the battery pack, so that as the tension sections are positioned in the rib groove when the battery pack is locked to the lower casing frame.

9. The battery pack locking device according to claim 7, further comprising:
   elastic means arranged beneath the button member, whereby the inner protrusions are moved beneath the outer protrusions of the locking section when the button member is depressed against an elastic force of the elastic means, and the button member is moved in the first direction by the elastic force of the elastic means when the depression of the button member is released, so that the inner protrusions move the outer protrusions in the first direction.

10. The battery pack locking device according to claim 2, wherein the elastic section further comprises a locking rib provided at the one end of the battery pack and structured to be elastically deformed, and the locking rib is provided with the second lock releasing section and the lock retaining section.

* * * * *